Dec. 17, 1963 — R. L. WECHSLER ETAL — 3,114,596
DIRECT NECK COOLING DURING BLOW MOLDING
Filed Oct. 19, 1961
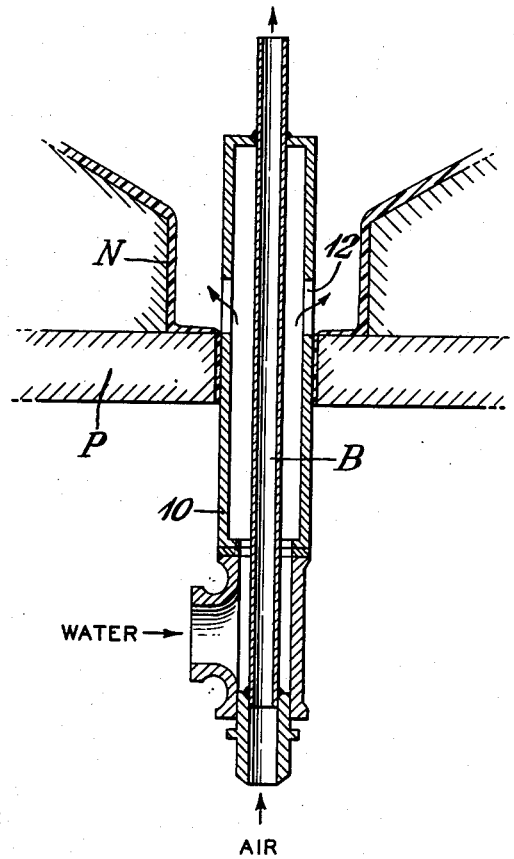
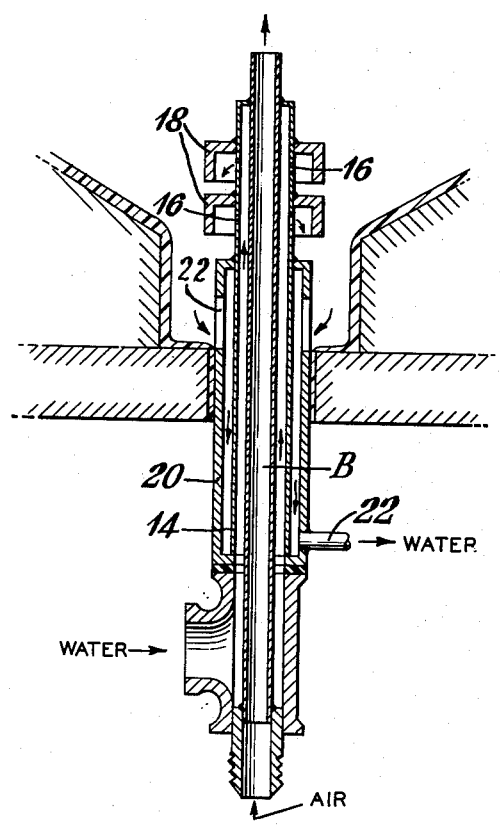
INVENTORS
ROBERT L. WECHSLER
HOWARD S. LANG
ATTORNEY

** 3,114,596
DIRECT NECK COOLING DURING BLOW MOLDING**
Robert L. Wechsler, Somerville, and Howard S. Lang, New Brunswick, N.J., assignors to Union Carbide Corporation, a corporation of New York
Filed Oct. 19, 1961, Ser. No. 146,166
3 Claims. (Cl. 18—55)

This invention relates to direct neck cooling during blow molding of necked plastic containers.

Overall cycle time in the blow molding of plastic bottles is largely determined by the length of time required for cooling. The greatest heat reservoir is commonly located in the thickest portion which is the neck of the bottle.

The main object of the present invention is to reduce the cycle time by quickly cooling the neck section of the container.

In processes where bottles are blown in the upright position, neck cooling is accomplished externally only by circulating cold water in the neck section of the mold. In those processes where the bottle is blown in an inverted position over a blow pin, cooling is accomplished externally by cooling water in the mold, and sometimes, internally by a water jacketed blow pin. Although cooling in this manner is more efficient, the use of a blow pin to facilitate cooling results in flash on the neck section, yielding a bottle of poorer appearance and quality.

Another object is to provide both internal and external cooling while avoiding the formation of undesirable flash.

According to the present invention, cooling fluid under pressure greater than the blow air pressure is forced through apertures in a fluid tube surrounding the blow pin in the mold neck section to cool the container neck during the molding cycle. The cooling fluid may be forced out through the apertures by air pressure in the container prior to opening the mold at the completion of the molding cycle. For continuous circulation of the cooling fluid, the same may be drained through slots in an outlet tube surrounding the inlet tube.

In the preferred form, automatic direct neck cooling via water injection is particularly directed to those processes wherein a bottle is blown in an inverted position over a blow pin.

In the drawings:

FIG. 1 is a vertical axial section through the neck section of a mold and a blow pin section through the neck section of a mold provided with a blow pin according to and for carrying out the method of the present invention; and FIG. 2 is a similar section through a modification.

As shown in FIG. 1, the mold has a neck section N with a plate P attached thereto having a bore through which is inserted a blow pin B.

Surrounding the blow pin B is a fluid tube 10 which is inserted with the blow pin B through the bore in the plate P, which is about 0.020 inch larger than the outside of the tube 10. The tube 10 has apertures such as slots 12 above the plate P in the inserted position.

In operation, when the mold is closed for blowing, the mold limit switch is actuated. This starts a delay timer to allow air to blow for a pre-set length of time before water is introduced. Water is then injected into the neck and shoulder section of the bottle, and allowed to remain for the major portion of the cycle.

Shortly before completion of the molding cycle, the water is forced out through the slots by the pressure in the bottle. Blowing pressure is maintained throughout the mold closed interval, necessitating the introduction of cooling water at a pressure greater than that used for blowing.

In the form shown in FIG. 2, the blow pin B is surrounded by a middle tube 14, has small holes 16 around its circumference for water injection. Skirts 18 are provided over these holes to prevent spraying which would result in spotting of the bottle due to impingement of water on the hot plastic. The outer tube 20 has slots 22 to permit drainage of water from the bottle neck back therethrough and to exhaust through the water outlet 18. This form provides continuous circulation of water for the major portion of the molding cycle.

What is claimed is:

1. In a method of blow molding necked plastic containers in which plastic molding material is charged into an inverted mold having a neck section and air under pressure is blown into said plastic molding material through a blow pin in said neck section of the mold, the improvement which comprises forcing cooling fluid under pressure greater than said air pressure through apertures in a fluid tube surrounding said blow pin in said neck section to cool the container neck during the molding cycle.

2. In a method of blow molding neck plastic containers in which plastic molding material is charged into an inverted mold having a neck section and air under pressure is blown into said plastic molding material through a blow pin in the neck section of the mold, the improvement which comprises forcing cooling fluid under pressure greater than said air pressure through apertures in a tube surrounding said blow pin in said neck section to cool the container neck during the molding cycle, and at the completion of the molding cycle opening a valve and thereby forcing the cooling fluid out through said apertures by residual air pressure in the molded necked plastic container.

3. In a method of blow molding necked plastic containers in which plastic molding material is charged into an inverted mold having a neck section and air under pressure is blown into said plastic molding material through a blow pin in the neck section of the mold, the improvement which comprises forcing cooling fluid under pressure greater than said air pressure through apertures in a fluid inlet tube surrounding said blow pin in said neck section to cool the container neck during the molding cycle, and discharging said cooling fluid under the same pressure as said air pressure through apertures in a fluid outlet tube surrounding said inlet tube.

References Cited in the file of this patent
UNITED STATES PATENTS

| | | |
|---|---|---|
| 2,401,564 | Hofmann | June 4, 1946 |
| 2,792,593 | Hardgrove | May 21, 1957 |
| 2,903,740 | Parfrey | Sept. 15, 1959 |

FOREIGN PATENTS

| | | |
|---|---|---|
| 670,716 | Great Britain | Apr. 23, 1952 |
| 864,739 | Great Britain | Apr. 6, 1961 |